(12) United States Patent
Chhabra et al.

(10) Patent No.: US 6,973,513 B1
(45) Date of Patent: Dec. 6, 2005

(54) METHOD FOR EFFICIENT USE OF A TRANSMIT ENGINE

(75) Inventors: Pankaj Chhabra, Sunnyvale, CA (US); George Lin, Fremont, CA (US)

(73) Assignee: 3Com Corporation, Santa Clara, CA (US)

( * ) Notice: Subject to any disclaimer, the term of this patent is extended or adjusted under 35 U.S.C. 154(b) by 806 days.

(21) Appl. No.: 09/829,644

(22) Filed: Apr. 9, 2001

(51) Int. Cl.[7] .............................................. G06F 13/14
(52) U.S. Cl. ......................................... 710/53; 710/36
(58) Field of Search ............................. 710/52–54, 36; 711/5, 118, 157; 370/412–413

(56) References Cited

U.S. PATENT DOCUMENTS

| | | | |
|---|---|---|---|
| 6,026,464 A * | 2/2000 | Cohen | 711/5 |
| 6,266,734 B1 * | 7/2001 | LaBerge | 711/5 |
| 6,434,631 B1 * | 8/2002 | Bruno et al. | 710/6 |
| 6,556,579 B1 * | 4/2003 | Lindeborg et al. | 370/412 |
| 6,675,238 B1 * | 1/2004 | Coffman et al. | 710/46 |

* cited by examiner

Primary Examiner—Kim Huynh

(57) ABSTRACT

A method for providing efficient use of a transmit engine in transmitting packet directing information. In one embodiment, two linked lists are used to submit packets and packet directing information to a transmit engine. When there is no packet to send, both lists are marked as free. When software desires to send a packet to hardware, the packet is placed on the first linked list. Software marks the first linked list as busy. If the transmit engine is not busy with the second linked list, software will start the transmit engine utilizing the first linked list. While the first linked list is marked as busy, all additional packets are directed to the second linked list. When the packets of the first linked list have been sent, software marks the first linked list as free.

25 Claims, 10 Drawing Sheets

INITIAL CONDITION

<u>SOFTWARE LISTS</u>                                   <u>TRANSMIT ENGINE</u>

LIST A          FREE

FREE

LIST B          FREE

AS FLOW CONTINUES

SOFTWARE SENDS ONE PACKET

| SOFTWARE LISTS | TRANSMIT ENGINE |

LIST A    BUSY

FREE

PROGRAM ADDRESS OF LIST A         BUSY WITH LIST A
LIST B    FREE

BUSY WITH LIST A

TRANSMIT ENGINE WORKING ON LIST A, SOFTWARE WANTS TO SEND MORE PACKETS

SOFTWARE LISTS                          TRANSMIT ENGINE

LIST A     BUSY                         BUSY WITH LIST A

SOFTWARE PUTS ALL PACKETS IN LIST B     BUSY WITH LIST A

LIST B     FREE

BUSY WITH LIST A

HARDWARE ISSUES INTERRUPT FOR BUSY LIST

SOFTWARE LISTS                          TRANSMIT ENGINE

LIST A        BUSY                      INTERRUPT FOR LIST A

SOFTWARE MARKS LIST A AS FREE AND
       LIST B AS BUSY.
                                        TRANSMIT ENGINE
                                        BUSY WITH LIST B
SOFTWARE PROGRAMS ADDRESS OF
   LIST B TO TRANSMIT ENGINE.

HARDWARE WORKING ON LIST B and SOFTWARE WANTS TO SEND MORE PACKETS

| SOFTWARE LISTS | | TRANSMIT ENGINE |
|---|---|---|
| LIST A | FREE | WORKING ON LIST B |

| LIST B | BUSY | WORKING ON LIST B |

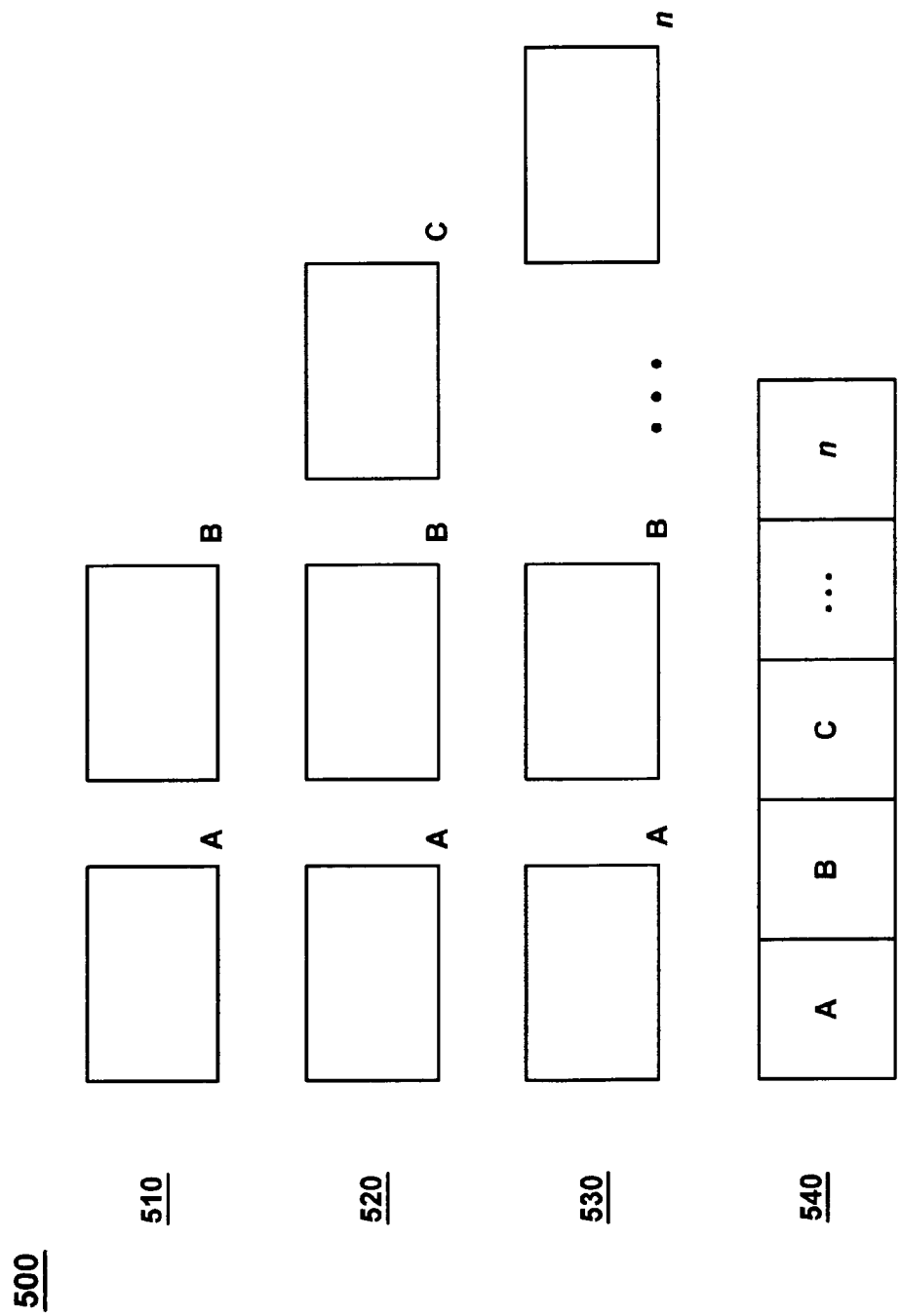

METHOD FOR EFFICIENT USE OF A TRANSMIT ENGINE

FIELD OF INVENTION

The present invention relates to the field of computer systems. More specifically, the present invention relates to transmit engines used in transmitting packets of information.

BACKGROUND OF THE INVENTION

A transmit engine is the main engine used by a computer system for transmitting packets. Transmit engines are utilized in several devices, including but not limited to switches, hubs, routers, and network interface cards (NICs). A transmit engine operates by receiving packets issued by software which are then placed into a linked list. The software of the computer system sends the packets to the linked list for transmission. The transmit engine works on the linked list, going from packet to packet down the list, in transmitting the packets appropriately.

In a typical working environment, software continuously issues packets to the transmit engine, adding packets to the linked list. Current transmit engine architecture requires that the software stall the transmit engine each time a packet is added to the transmit linked list.

The transmit engine must be stalled to avoid corruption of the packet being sent to the linked list and the packets currently on the linked list. At no point does the software know which packet the transmit engine is currently working on the linked list, the transmit engine may be working on any packet. As a result, in order to avoid corruption, the software must first stall the transmit engine, then add the packet to the linked list, and then must unstall the transmit engine.

It should also be appreciated that the transmit engine must be stalled before inserting a packet into the linked list to avoid hanging the computer system. If the transmit engine is in the process of sending a packet, and another packet is placed in the linked list, it is possible that the insertion of the new packet will cause the system to hang. As a result, in order to avoid hanging the system, the software must first stall the transmit engine, then add the packet to the linked list, and then must unstall the transmit engine.

The requirement of stalling the transmit engine each time a packet is to be inserted presents problems concerning the speed and efficiency of the transmit engine. Constant interruption of the transmit engine results in the loss of a series of clock cycles. Clock cycles are required for the software to notify the controlling processor to stop the transmit engine, for the processor to notify the transmit engine, for the processor to notify the software that the transmit engine has stopped, and for the software to insert the new packet. Unstalling the transmit engine results in additional loss of clock cycles.

Accordingly, a need exists for a method for providing efficient use of a transmit engine by not requiring the transmit engine to stall during the adding of a packet to a linked list such that the transmit engine may operate at a faster speed. Furthermore, there is a need for a method for adding packets to a linked list without the risk of corrupting the packet or hanging the hardware. Furthermore, there is a need for such a method that is also commercially economical.

SUMMARY OF THE INVENTION

The present invention provides a method for efficient use of a transmit engine by not requiring the transmit engine to stall during the adding of a packet to a linked list. The present invention also provides a method for adding packets to a linked list without the risk of corrupting the packet or hanging the hardware. The present invention is implemented in a commercially economical manner. The present invention provides these advantages and others not specifically mentioned above but described in the sections to follow.

A method for providing efficient use of a transmit engine in transmitting packets and packet directing information is described. The present invention provides for the efficient use of a transmit engine for transmitting the packets, sending a request, or performing a direct memory access (DMA) transfer. In one embodiment, two linked lists are used to submit packets and packet directing information to a transmit engine. When there is no packet to send, both lists are marked as free. When software desires to send a packet to hardware, the packet is placed on the first linked list. Software marks the first linked list as busy. If the transmit engine is not busy with the second linked list, software will start the transmit engine utilizing the first linked list.

While the first linked list is marked as busy, all additional packets are directed to the second linked list. When the packets of the first linked list have been sent, software marks the first linked list as free. The second linked list is then marked as busy and the transmit engine begins transmitting the packets of the second linked list. While the second linked list is marked as busy, all additional packets are directed to the first linked list.

The present invention operates by alternating between the first linked list and the second linked list. One linked list directs the transmit engine and the other linked list receives additional packets without requiring the transmit engine to stall while the packets are received. The present invention provides an efficient transmit engine by not requiring the transmit engine to stop each time a packet is added to a linked list.

In one embodiment, the present invention utilizes more than two linked lists. In one embodiment, the transmit engine provides a Quality of Service (QoS) scheme in selecting which linked list to use at any given moment. In one embodiment, certain types of packets can be directed to certain linked lists, where each linked list is given a priority. Only when all linked lists with higher priority are marked as free, would the transmit engine use a linked list of lower priority.

In another embodiment, the linked lists used are chained together. In the situation where the volume of packets being directed by the transmit engine is low, linked lists are chained together for a time until the volume of traffic increases.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 5 shows a block diagram of various configurations of memory partitions in accordance with one embodiment of the present invention.

DETAILED DESCRIPTION

Figure 1:
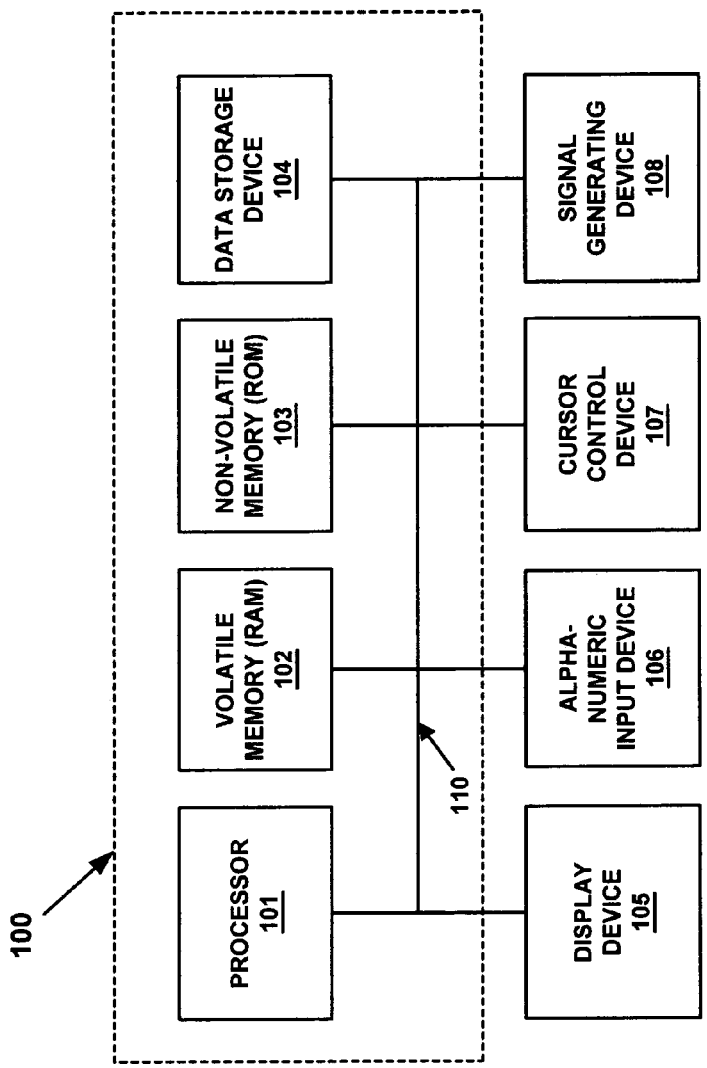
FIG. 1 illustrates an exemplary computer system platform upon which embodiments of the present invention may be practiced.

Refer now to FIG. 1 which illustrates an exemplary computer system 100 upon which embodiments of the present invention may be practiced. In general, computer system 100 comprises bus 110 for communicating information, processor 101 coupled with bus 110 for processing information and instructions, random access (volatile) memory (RAM) 102 coupled with bus 110 for storing information and instructions for processor 101, read-only (non-volatile) memory (ROM) 103 coupled with bus 110 for storing static information and instructions for processor 101, data storage device 104 such as a magnetic or optical disk and disk drive coupled with bus 110 for storing information and instructions.

In one embodiment, computer system 100 comprises an optional user output device such as display device 105 coupled to bus 110 for displaying information to the computer user, an optional user input device such as alphanumeric input device 106 including alphanumeric and function keys coupled to bus 110 for communicating information and command selections to processor 101, and an optional user input device such as cursor control device 107 coupled to bus 110 for communicating user input information and command selections to processor 101. Furthermore, an optional input/output (I/O) device 108 is used to couple computer system 100 onto, for example, a network.

Display device 105 utilized with computer system 100 may be a liquid crystal device, cathode ray tube, or other display device suitable for creating graphic images and alphanumeric characters recognizable to the user. Cursor control device 107 allows the computer user to dynamically signal the two-dimensional movement of a visible symbol (pointer) on a display screen of display device 105. Many implementations of the cursor control device are known in the art including a trackball, mouse, joystick or special keys on alphanumeric input device 106 capable of signaling movement of a given direction or manner of displacement. It is to be appreciated that the cursor control 107 also may be directed and/or activated via input from the keyboard using special keys and key sequence commands. Alternatively, the cursor may be directed and/or activated via input from a number of specially adapted cursor directing devices.

Figure 2:
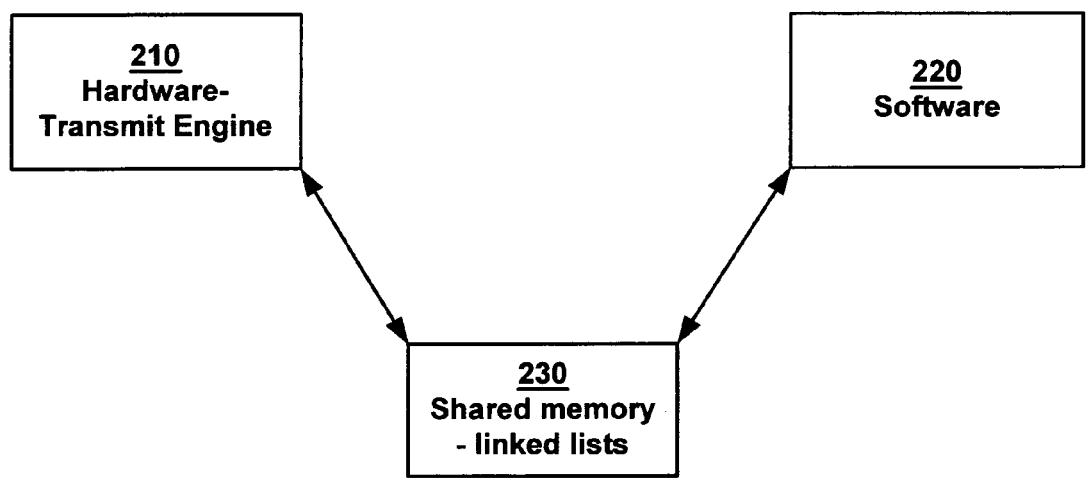
FIG. 2 shows a block diagram of a computer system comprising a transmit engine in accordance with one embodiment of the present invention.

FIG. 2 shows a block diagram of a computer system 200 comprising a transmit engine in accordance with one embodiment of the present invention. Hardware 210 and software 220 both run on shared memory 230.

In one embodiment, hardware 210 is a transmit engine for transmitting packets of information. In the present embodiment, software 220 sends packets to shared memory 230. Shared memory 230 comprises at least one linked list. A linked list is a list that contains packets intended for transmission by the transmit engine. Hardware 210 (e.g. a transmit engine) runs on one linked list at a time, going in order in transmitting the packets accordingly, performing on each packet distinctly.

In one embodiment, each linked list is a partitioned location a shared memory 230. It should be appreciated that a linked list does not require its own memory, but rather is a virtually partitioned location of one memory (e.g. RAM 102 of FIG. 1). In this manner, shared memory 230 can contain multiple linked lists, each being a virtually partitioned location of shared memory 230.

FIG. 5 shows a block diagram 500 of various configurations of memory partitions in accordance with one embodiment of the present invention. Memory 510 shows two distinct memories, memory A and memory B. Memory A and memory B each comprise one linked list. Memory 520 shows three distinct memories, memory A, memory B and memory C. Each memory comprises one linked list. Memory 530 shows n distinct memories, where n is any number. As above, each memory comprises one linked list.

Still with reference to FIG. 5, memory 540 shows one memory that is virtually partitioned to include n number of memory partitions on one memory. In one embodiment, each virtual partition comprises one linked list. As such, any number of linked lists is operable in the present invention without requiring more than one memory unit.

In one embodiment, the present invention is a software invention. The present invention is implemented in software that alters the typical functioning of the software interaction between the software and the transmit engine.

Figure 3A:
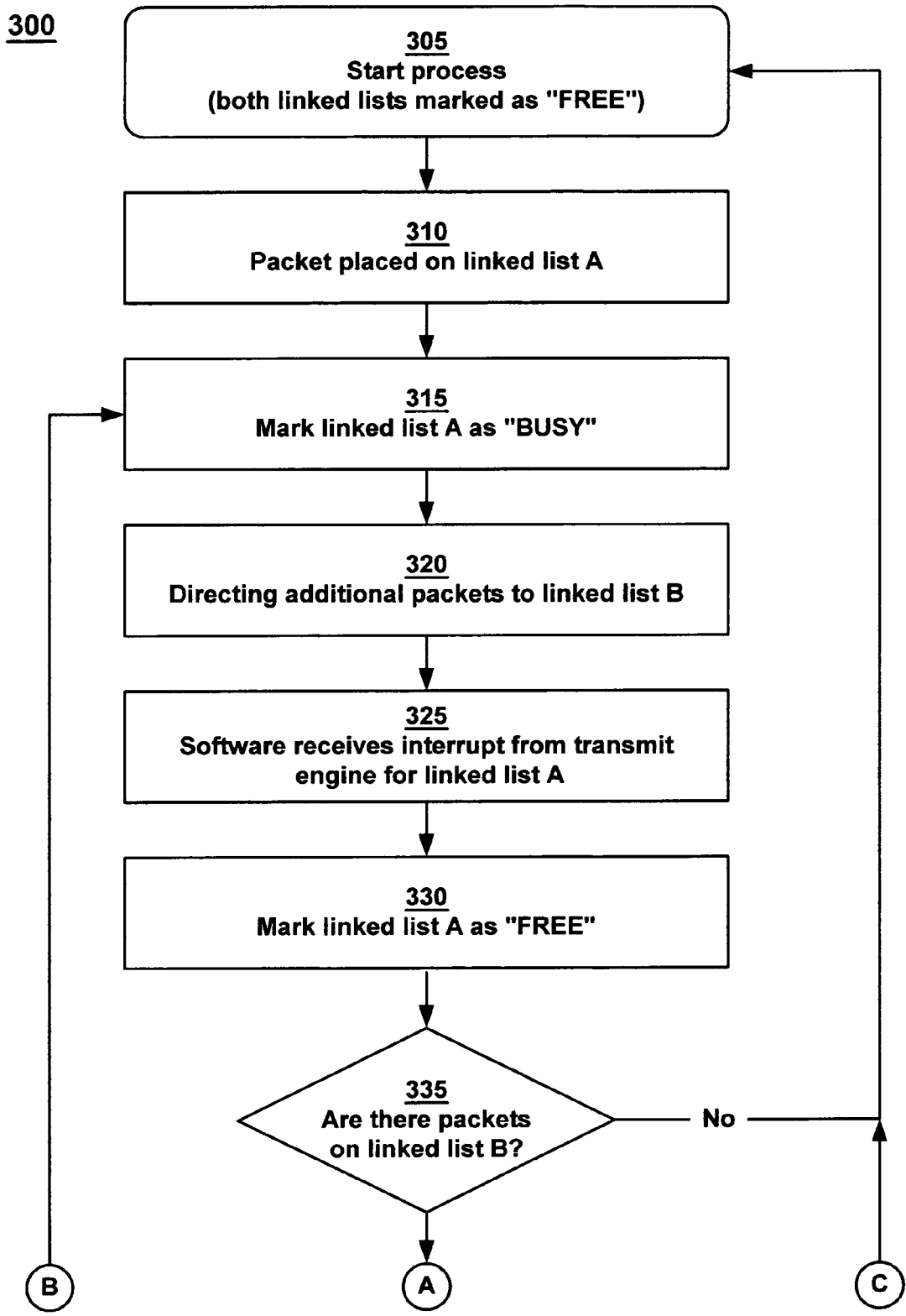
FIGS. 3A and 3B show a flowchart diagram of a process for providing efficient use of a transmit engine in transmitting packets utilizing two linked lists in accordance with one embodiment of the present invention.
Figure 3B:
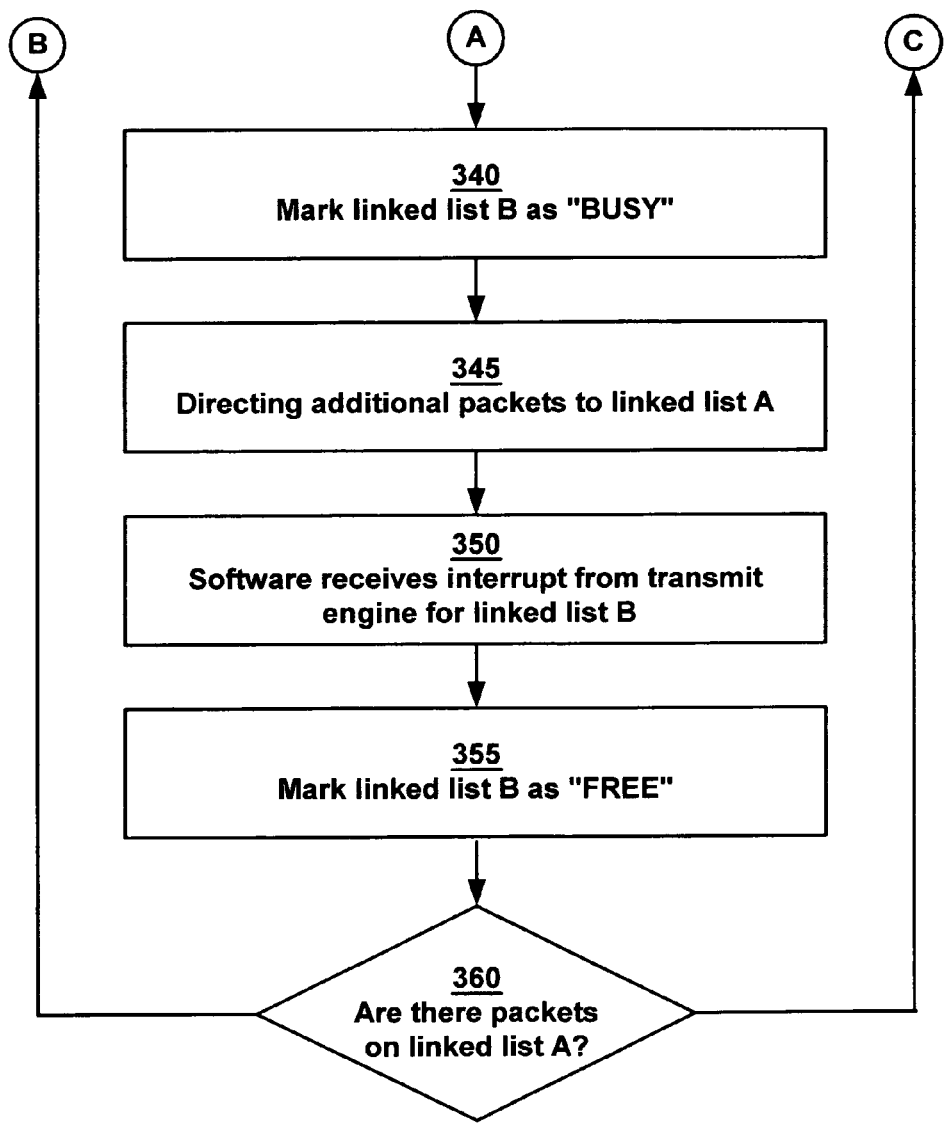

FIGS. 3A and 3B show a flowchart diagram of a process 300 for providing efficient use of a transmit engine in transmitting packets utilizing two linked lists in accordance with one embodiment of the present invention. In one embodiment, process 300 is implemented in software operable to run on a computer system (e.g. computer system 100 of FIG. 1).

Referring first to FIG. 3A, at step 305, process 300 begins. In one embodiment, when process 300 begins both linked list A and linked list B are marked as "FREE." Marking a list as FREE indicates to the software that packets may be placed on the linked list. Conversely, a linked list is marked as "BUSY" indicates to the software that the transmit engine is busy with the linked list, and packets may not be placed on the linked list.

At step 310, the software places a packet is placed on linked list A, as linked list A is marked FREE. It should be appreciated that packets may be placed on any linked list marked as FREE. The linked lists are interchangeable for purposes of the present inventions. In another embodiment, a packet is placed on linked list B. Linked list A is used in process 300 for exemplary purposes only.

At step 315, linked list A is marked as BUSY by the software. Upon being marked as BUSY, the transmit engine begins working on the packets of linked list A, transmitting them appropriately.

At step 320, all packets sent by the software to the transmit engine are directed to linked list B. Linked list B can receive packets at the same time the transmit engine is working with linked list A. Placing packets on linked list B does not require that linked list A be stalled. It should be appreciated that linked list A can continue to direct the transmit engine even when linked list B is receiving packets from the software.

At step 325, the software receives an interrupt signal from the transmit engine. In one embodiment, linked list A is adapted to provide the software with an interrupt signal upon the completion of transmitting all packets of linked list A. The interrupt signal is placed after the last of the packets located in linked list A.

At step 330, linked list A is marked as FREE. In one embodiment, once linked list A has completed transmitting the packets located thereon, linked list A is marked as FREE.

At step 335, it is determined whether any packets have been received by linked list B. If no packets have been received, process 300 returns to step 305, where both lists are marked as FREE. If packets have been received by linked list B, process 300 continues on to step 340.

Referring now to FIG. 3B, at step 340, linked list B is marked as BUSY by the software. Upon being marked as BUSY, the transmit engine begins working on the packets of linked list B, transmitting them appropriately.

At step 345, all packets sent by the software to the transmit engine are directed to linked list A. Linked list A can receive packets at the same time the transmit engine is working with linked list B. Placing packets on linked list A does not require that linked list B be stalled. It should be appreciated that linked list B can continue to direct the transmit engine even when linked list A is receiving packets from the software.

At step 350, the software receives an interrupt signal from the transmit engine. In one embodiment, linked list B is adapted to provide the software with an interrupt signal upon the completion of transmitting all packets of linked list B. The interrupt signal is placed after the last of the packets located in linked list B.

At step 355, linked list B is marked as FREE. In one embodiment, once linked list B has completed transmitting the packets located thereon, linked list B is marked as FREE.

At step 360, it is determined whether any packets have been received by linked list A. If no packets have been received, process 300 returns to step 305, where both lists are marked as FREE. If packets have been received by linked list B, process 300 returns to step 315 for directing the packets of linked list A.

It should be appreciated that process 300 can be expanded to operate on more than two linked lists. In one embodiment, process 300 is expanded to operated on three linked lists. The present embodiment is desirable, for example, in a situation where the transmit engine operates at a very fast speed. Also, the present embodiment is used where a Quality of Service (QoS) scheme is desired. In a QoS scheme, each linked list is given a priority. Each packet is sent to the appropriate linked list. In one embodiment, the transmit engine only works on a linked list of lower priority when linked lists of higher priority are free.

In another embodiment, the linked lists are chained together. The present embodiment is desirable, for example, in a QoS situation where there are multiple linked lists and the number of packets in individual lists are small. The lists can be combined to save the number of interrupts from the transmit engine to the host computer.

FIGS. 4A through 4E show block diagrams illustrating the steps of a process for providing efficient use of a transmit engine in transmitting packets utilizing two linked lists in accordance with one embodiment of the present invention.

Figure 4A:
FIGS. 4A through 4E show block diagrams illustrating the steps of a process for providing efficient use of a transmit engine in transmitting packets utilizing two linked lists in accordance with one embodiment of the present invention.
Figure 4A:

Referring first to FIG. 4A, the initial condition (e.g. step 305 of FIG. 3A) is shown. In the present embodiment, both linked list A and linked list B are marked as FREE, and the transmit engine is free because it is not working with either linked list.

Figure 4B:
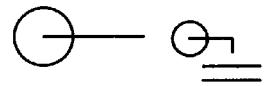
Figure 4B:

FIG. 4B illustrates the situation where software places a packet on linked list A for transmission by the transmit engine (e.g. step 310 of FIG. 3A). The software marks linked list A as BUSY (e.g. step 315 of FIG. 3A).

Figure 4C:
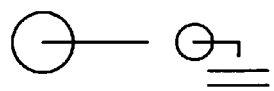
Figure 4C:
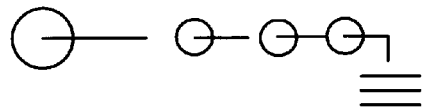

FIG. 4C illustrates the situation where the software desires to send more packets while the transmit engine is working on linked list A. Software places additional packets on linked list B, which is still marked as FREE (e.g. step 320 of FIG. 3A). Placing packets on linked list B does not require the software to stall linked list A. The acts of placing packets on linked list B and the transmit engine working on linked list A operate simultaneously and independently of each other, causing no interference.

Figure 4D:
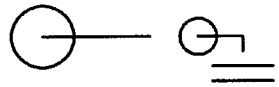

FIG. 4D illustrates the situation where the transmit engine issues an interrupt signal for linked list A, indicating that the transmit engine has completed all activity with respect to linked list A (e.g. step 325 of FIG. 3A). Upon receiving the interrupt signal, the software marks linked list A as FREE (e.g. step 330 of FIG. 3A). If there are packets in linked list B, the software marks linked list B as BUSY (e.g. step 340 of FIG. 3B).

Figure 4E:
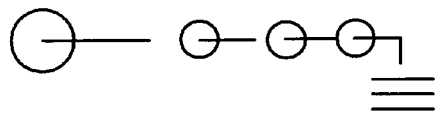
Figure 4E:
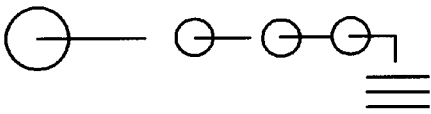

FIG. 4E illustrates the situation where the software desires to send more packets while the transmit engine is working on linked list B. Software places additional packets on linked list A, which is marked as FREE (e.g. step 345 of FIG. 3A). The acts of placing packets on linked list A and the transmit engine working on linked list B operate simultaneously and independently of each other, causing no interference.

The present invention is applicable where the software has a series of packets to send to the transmit engine for transmission. The present invention does not require the stalling of the transmit engine to load packets onto the transmit engine, thereby saving clock cycles.

The preferred embodiment of the present invention, a method for providing efficient use of a transmit engine in transmitting packet directing information, is thus described. While the present invention has been described in particular embodiments, it should be appreciated that the present invention should not be construed as limited by such embodiments, but rather construed according to the below claims.

What is claimed is:

1. A method for providing efficient use of a transmit engine in transmitting packet directing information, said method comprising the steps of:
    a) loading a first memory with packet directing information, said first memory adapted to provide information to drive a transmit engine to direct packets therefrom;
    b) provided said loading of said step a) is completed, marking said first memory as busy and directing said packets according to said packet directing information; and
    c) provided said first memory is marked as busy, directing additional packet directing information to a second memory such that said second memory is adapted to be loaded with said additional packet directing information without interrupting said first memory, said second memory adapted to provide information to drive said transmit engine to direct packets therefrom, wherein said first memory and said second memory are linked lists of said transmit engine.

2. The method as recited in claim 1 further comprising the steps of:
    d) provided said first memory has completed directing packets to hardware according to said packet directing information, marking said first memory as free;

e) provided said loading of said step c) is completed and said first memory is marked as free, marking said second memory as busy and directing said packets according to said additional packet directing information.

3. The method as recited in claim 2 further comprising the step of:
   f) provided said second memory is marked as busy, directing additional packet directing information to said first memory such that said first memory is adapted to be loaded with said additional packet directing information without interrupting said second memory.

4. The method as recited in claim 3 further comprising a third memory, said third memory adapted to be loaded with said additional packet directing information without interrupting said second memory, said third memory adapted to provide information to drive said transmit engine to direct said packets to hardware.

5. The method as recited in claim 1 wherein a primary memory comprises said first memory and said second memory such that said first memory and said second memory are partitioned locations of said primary memory.

6. The method as recited in claim 5 wherein said primary memory further comprises a third memory such that said third memory is a partitioned location of said primary memory.

7. The method as recited in claim 1 wherein said first memory and said second memory are linked together to operate as a single memory.

8. A computer system comprising:
   a bus;
   a memory unit coupled to said bus; and
   a processor coupled to said bus, said processor for executing a method for providing efficient use of a transmit engine in transmitting packet directing information, said method comprising the steps of:
   a) loading a first memory with packet directing information, said first memory adapted to provide information to drive a transmit engine to direct packets therefrom;
   b) provided said loading of said step a) is completed, marking said first memory as busy and directing said packets according to said packet directing information; and
   c) provided said first memory is marked as busy, directing additional packet directing information to a second memory such that said second memory is adapted to be loaded with said additional packet directing information without interrupting said first memory, said second memory adapted to provide information to drive said transmit engine to direct packets therefrom, wherein said first memory and said second memory are linked lists of said transmit engine.

9. The computer system as recited in claim 8 wherein said processor performs said method for providing efficient use of a transmit engine in transmitting packet directing information, said method further comprising the steps of:
   d) provided said first memory has completed directing packets to hardware according to said packet directing information, marking said first memory as free;
   e) provided said loading of said step c) is completed and said first memory is marked as free, marking said second memory as busy and directing said packets according to said additional packet directing information.

10. The computer system as recited in claim 9 wherein said processor performs said method for providing efficient use of a transmit engine in transmitting packet directing information, said method further comprising the step of:
    f) provided said second memory is marked as busy, directing additional packet directing information to said first memory such that said first memory is adapted to be loaded with said additional packet directing information without interrupting said second memory.

11. The computer system as recited in claim 10 further comprising a third memory, said third memory adapted to be loaded with said additional packet directing information without interrupting said second memory, said third memory adapted to provide information to drive said transmit engine to direct said packets to hardware.

12. The computer system as recited in claim 8 wherein said memory unit comprises said first memory and said second memory such that said first memory and said second memory are partitioned locations of said memory unit.

13. The method as recited in claim 12 wherein said memory unit further comprises a third memory such that said third memory is a partitioned location of said memory unit.

14. The method as recited in claim 8 wherein said first memory and said second memory are linked together to operate as a single memory.

15. A computer-usable medium having computer readable program code embodied therein for causing a computer system to perform the steps of:
    a) loading a first memory with packet directing information, said first memory adapted to provide information to drive a transmit engine to direct packets therefrom;
    b) provided said loading of said step a) is completed, marking said first memory as busy and directing said packets according to said packet directing information; and
    c) provided said first memory is marked as busy, directing additional packet directing information to a second memory such that said second memory is adapted to be loaded with said additional packet directing information without interrupting said first memory, said second memory adapted to provide information to drive said transmit engine to direct packets therefrom, wherein said first memory and said second memory are linked lists of said transmit engine.

16. The computer-usable medium as recited in claim 15 wherein said computer readable program code embodied therein for causes a computer system to perform the steps of:
    d) provided said first memory has completed directing packets to hardware according to said packet directing information, marking said first memory as free;
    e) provided said loading of said step c) is completed and said first memory is marked as free, marking said second memory as busy and directing said packets according to said additional packet directing information.

17. The computer-usable medium as recited in claim 16 wherein said computer readable program code embodied therein for causes a computer system to perform the step of:
    f) provided said second memory is marked as busy, directing additional packet directing information to said first memory such that said first memory is adapted to be loaded with said additional packet directing information without interrupting said second memory.

18. The computer-usable medium as recited in claim 17 further comprising a third memory, said third memory adapted to be loaded with said additional packet directing information without interrupting said second memory, said third memory adapted to provide information to drive said transmit engine to direct said packets to hardware.

19. The computer-usable medium as recited in claim 16 wherein a primary memory comprises said first memory and said second memory such that said first memory and said second memory are partitioned locations of said primary memory.

20. The computer-usable medium as recited in claim 19 wherein said primary memory further comprises a third memory such that said third memory is a partitioned location of said primary memory.

21. The computer-usable medium as recited in claim 15 wherein said first memory and said second memory are linked together to operate as a single memory.

22. A method for providing efficient use of a transmit engine in transmitting packet directing information, said method comprising the steps of:
 a) loading a first memory with packet directing information, said first memory adapted to provide information to drive a transmit engine to direct packets therefrom, said first memory residing in a partitioned location of a primary memory;
 b) provided said loading of said step a) is completed, marking said first memory as busy and directing said packets according to said packet directing information;
 c) provided said first memory is marked as busy, directing additional packet directing information to a second memory such that said second memory is adapted to be loaded with said additional packet directing information without interrupting said first memory, said second memory adapted to provide information to drive said transmit engine to direct packets therefrom, said second memory residing in a partitioned location of said primary memory, wherein said first memory and said second memory are linked lists of said transmit engine;
 d) provided said first memory has completed directing packets to hardware according to said packet directing information, marking said first memory as free;
 e) provided said loading of said step c) is completed and said first memory is marked as free, marking said second memory as busy and directing said packets according to said additional packet directing information; and
 f) provided said second memory is marked as busy, directing additional packet directing information to said first memory such that said first memory is adapted to be loaded with said additional packet directing information without interrupting said second memory.

23. The method as recited in claim 22 further comprising a third memory, said third memory adapted to be loaded with said additional packet directing information without interrupting said second memory, said third memory adapted to provide information to drive said transmit engine to direct said packets to hardware.

24. The method as recited in claim 23 wherein said primary memory further comprises a third memory such that said third memory is a partitioned location of said primary memory.

25. The method as recited in claim 22 wherein said first memory and said second memory are linked together to operate as a single memory.

* * * * *